(12) United States Patent
Werman et al.

(10) Patent No.: US 7,771,069 B2
(45) Date of Patent: Aug. 10, 2010

(54) THREE-DIMENSIONAL LIGHTED GAUGE

(75) Inventors: Reben Werman, Sterling Heights, MI (US); Takahira Kato, Novi, MI (US)

(73) Assignee: DENSO International America, Inc., Southfield, MI (US)

( * ) Notice: Subject to any disclaimer, the term of this patent is extended or adjusted under 35 U.S.C. 154(b) by 266 days.

(21) Appl. No.: 12/074,597

(22) Filed: Mar. 5, 2008

(65) Prior Publication Data
US 2009/0223436 A1 Sep. 10, 2009

(51) Int. Cl.
*H04M 1/22* (2006.01)

(52) U.S. Cl. .............. 362/29; 362/23; 362/26; 362/30; 362/511

(58) Field of Classification Search .......... 362/23–30, 362/471, 489, 85, 511; 116/286–288, DIG. 5, 116/DIG. 6
See application file for complete search history.

(56) References Cited

U.S. PATENT DOCUMENTS

| | | | |
|---|---|---|---|
| 6,004,140 A | 12/1999 | Kato et al. | |
| 6,065,846 A | 5/2000 | Kato et al. | |
| 6,318,872 B1 | 11/2001 | Kato et al. | |
| 6,561,123 B2 * | 5/2003 | Kallinke et al. | 116/288 |
| 6,848,799 B2 * | 2/2005 | Kālāntār | 362/23 |
| 7,108,531 B2 | 9/2006 | Kato | |
| 7,242,381 B2 | 7/2007 | Kato et al. | |
| 7,275,497 B2 | 10/2007 | Kato | |
| 7,537,363 B2 * | 5/2009 | Kato | 362/489 |
| 7,675,428 B2 * | 3/2010 | Pala et al. | 340/815.78 |

FOREIGN PATENT DOCUMENTS

JP 2007-033082 2/2007

* cited by examiner

*Primary Examiner*—Jong-Suk (James) Lee
*Assistant Examiner*—Robert J May
(74) *Attorney, Agent, or Firm*—Harness, Dickey & Pierce, PLC (57) ABSTRACT

A gauge assembly that is illuminable by a light source is provided. The gauge assembly may include a dial face having a translucent portion forming at least a perimeter of the dial face and a cover disposed behind the dial. The cover may define a plurality of graduated lines, at least one of the graduated lines having a first portion extending behind the translucent portion and a second portion extending outward from the perimeter of the dial face. The first portion may be visible through the translucent portion when the gauge is illuminated by the light source and obscured by the translucent portion when the gauge is not illuminated by the light source.

9 Claims, 6 Drawing Sheets

THREE-DIMENSIONAL LIGHTED GAUGE

FIELD

The present disclosure relates to a three-dimensional gauge having illuminable graphics and graduations.

BACKGROUND

The statements in this section merely provide background information related to the present disclosure and may not constitute prior art. Operable devices often include a gauge that may provide real-time feedback regarding an operating condition of the device to a driver who may view the device. Some devices include an instrument panel having multiple gauges. An automobile, for example, includes an instrument panel having a speedometer, an RPM (revolutions per minute) gauge, an oil temperature gauge, and a gas level gauge. Some gauges in the instrument panel, however, may provide more critical information than other gauges and be referred to or viewed more often by the driver. For example, a driver is more apt to view a speedometer than an oil temperature gauge.

While it may be important for the gauge to provide real-time feedback to the driver, it is also important that the driver's primary focus be on operating the device as opposed to reading a gauge or gauges. Accordingly, it is desirable to provide a gauge that is distinctive from other gauges so that a driver may more quickly locate the gauge that is referred to more frequently during operation of the device. It may be further desirable to provide a gauge such that the information conveyed by the gauge is more quickly discernable by the driver.

SUMMARY

A gauge assembly that is illuminable by a light source may include a dial face having a translucent portion forming at least a perimeter of the dial face and a cover disposed behind the dial. The cover may define numerous graduated lines with at least one of the graduated lines having a first portion extending behind the translucent portion and a second portion extending outward from the perimeter of the dial face. The first portion may be visible through the translucent portion when the gauge is illuminated by the light source and obscured by the translucent portion when the gauge is not illuminated by the light source.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses. The gauge configurations described herein include a dial face that may include a translucent portion around a gauge periphery and from a driver's perspective, which may be disposed in front of a light-emitting prism. The light-emitting prism may include graduation lines, also known as grads, around a periphery of the light-emitting prism and may be illuminated by light emitted from the light prism. A portion of the grads may extend beyond a periphery of the dial face and be visible to the driver when the light prism is not emitting light. Another portion of the grads, also from the driver's perspective, may extend behind the dial face and may generally only become visible through the translucent portion of the dial face when the light prism emits light, thereby making the grads appear to grow in length. In some embodiments, a gap between the respective peripheries of the dial face and the light prism may create additional lighting effects. In other embodiments, the gap may be sealed off by a wall to create different lighting effects, reduced lighting effects, or essentially no lighting effects.

Throughout the remainder of the disclosure, the various embodiments will be described and illustrated as a speedometer gauge for a vehicle. However, it will be appreciated that the principles of the present disclosure may be incorporated into other types of gauges, such as an RPM gauge, a gas level gauge, an oil level gauge, and a temperature gauge, and may be used in various vehicular devices.

It should be understood that throughout the drawings that the same reference numeral is used between the various embodiments when describing components, features, or aspects of the various embodiments that are the same. Reference numerals incremented by 100 are used between the various embodiments when describing components, features, or aspects of the various embodiments that are similar to previously described components, features, or aspects of previous embodiments.

Figure 1:
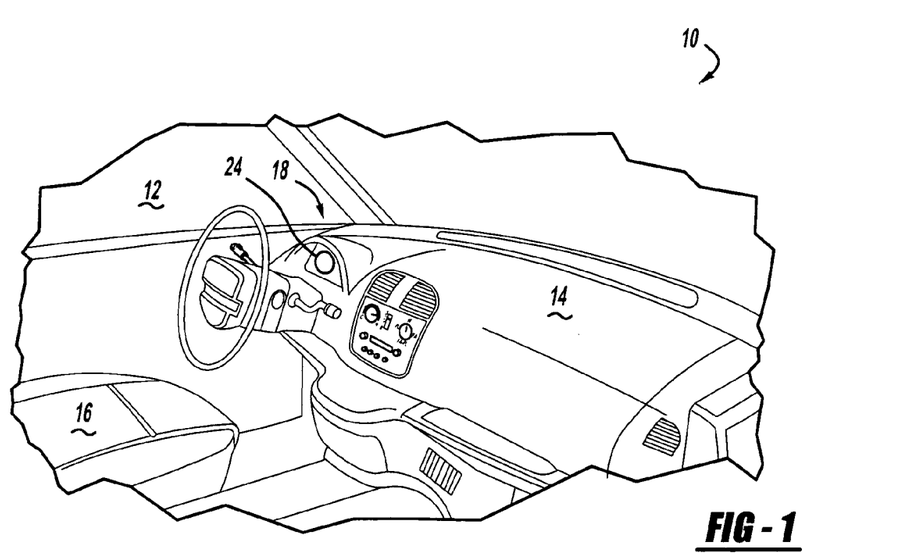
FIG. 1 is a partial view of a vehicle having an instrument cluster in accordance with the teachings of the present disclosure.
Figure 2:
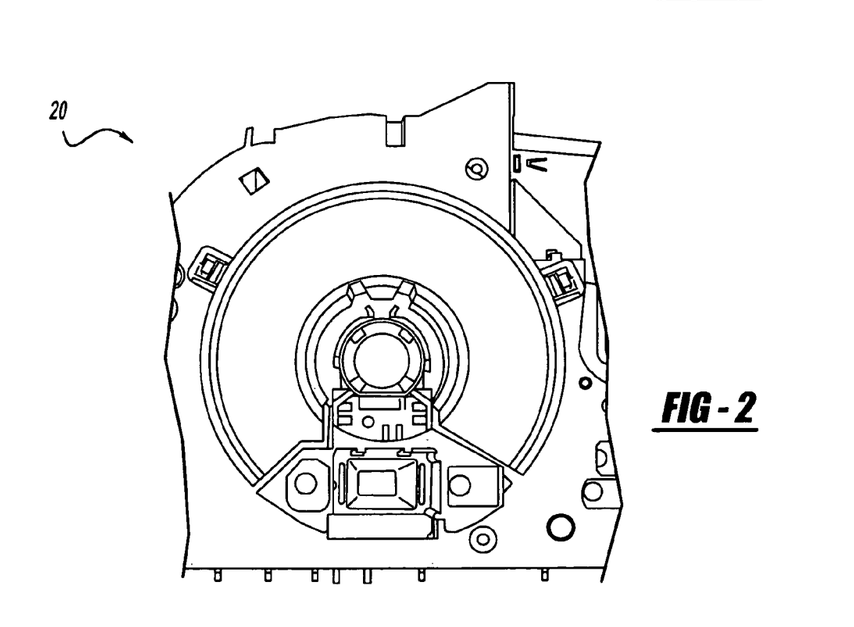
FIG. 2 is a partial top view of the instrument cluster of the vehicle of FIG. 1.

With reference now to FIGS. 1-11, aspects of the disclosure will now be explained. FIG. 1 depicts a vehicle 10 that may include a passenger compartment 12, which may further include a dashboard 14 and a seat 16. An instrument cluster assembly 18 mounted in the dashboard 14 may be viewable by a driver of the vehicle 10 when the driver is seated in the seat 16 and operating the vehicle 10. The instrument cluster assembly 18 may be disposed generally in front of the driver so that the driver can inspect or view a variety of gauges and other indicators or instruments that form part of the instrument cluster 18, which may indicate an operating condition or conditions of the vehicle 10. In this regard, it is desirable that information displayed on the instrument cluster assembly 18, such as vehicle speed in miles per hour or kilometers per hour, for example, may quickly be found and also quickly understood by the driver without diverting the driver's attention for a significant amount of time. That is, the driver should be afforded as much time as possible to operate or drive the vehicle 10 and spend only as much time as is absolutely necessary to reading gauges.

The instrument cluster assembly 18 may generally include a mounting board 20 (FIG. 2), which may generally provide a mounting location for a gauge 24 and a light source 22 (FIGS. 6-11). It will be appreciated that the instrument cluster assembly 18 may also include additional components, such as other gauges, lights, circuit boards, fasteners, etc, that may not be shown or described.

Figure 6:
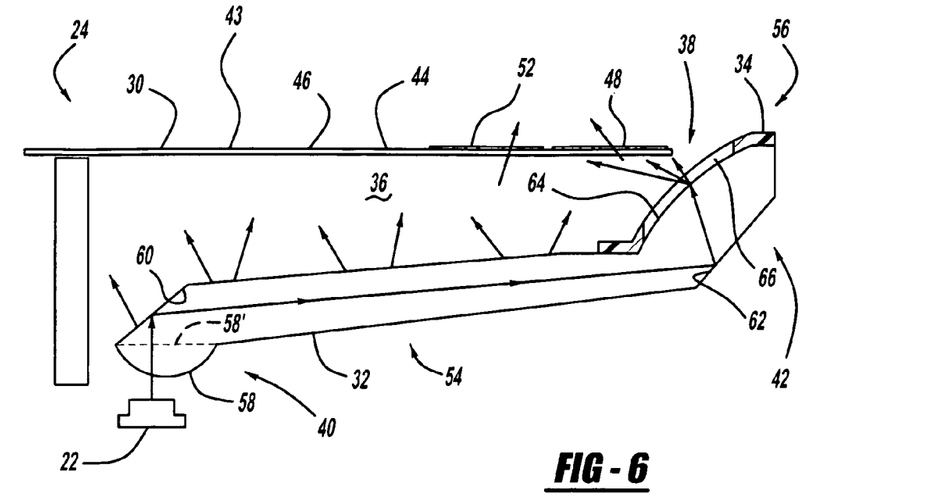
FIG. 6 is a cross-sectional view of the gauge assembly of FIG. 3.

Continuing with FIG. 6, the light source 22 may be a conventional light source such as a light bulb, or it may be a light-emitting diode (LED). The light source 22 may be positioned near or proximate the gauge 24 to illuminate portions of the gauge 24 in a manner which will be discussed later in greater detail. The light source 22 may be secured to the mounting board 20 or otherwise secured in any convenient location within the vehicle 10 that permits light emitted from the light source 22 to illuminate the gauge 24. For example, the light source 22 may be placed more remotely from the gauge 24, and light emitted from the light source 22 may be directed, channeled or carried to the gauge 24 utilizing light-carrying methods or components, such as fiber-optic wire or light-carrying bodies.

Referring now to FIGS. 3-6, a first embodiment of a gauge is shown and indicated by the reference numeral 24. The gauge 24 may generally include a dial face 30, a light-carrying prism 32, and a prism cover 34. It will be appreciated that the gauge 24 and subsequently described gauge embodiments may also include additional components, such as a pointer and a spindle, which supports the pointer even during pointer rotation, but are not depicted.

The dial face 30 may be disposed in front of the light-carrying prism 32 such that a gap, space or void 36 is defined therebetween. Respective peripheries of the dial face 30 and the light-carrying prism 32 together may define a void, space or gap 38, which may provide unobstructed access to the void 36. A light-receiving inner portion 40 of the light-carrying prism 32 may be disposed near the light source 22 and a light-emitting outer portion 42 generally define extremities of the light-carrying prism 32. The prism cover 34, which may be in the shape of a circle or ring, may be disposed generally in the gap 38 and rest upon or be secured to the light-carrying prism 32. Configured in this manner, the light-carrying prism 32 may receive light from the light source 22 to illuminate the void 36 and the prism cover 34. While not depicted, it will be appreciated that the dial face 30, the light-carrying prism 32, and the prism cover 34 may be secured to each other and to the mounting board 20 in a suitable manner such as with traditional fasteners such as screws, rivets, glue and devices to create a snap fit between the pieces.

Figure 3:
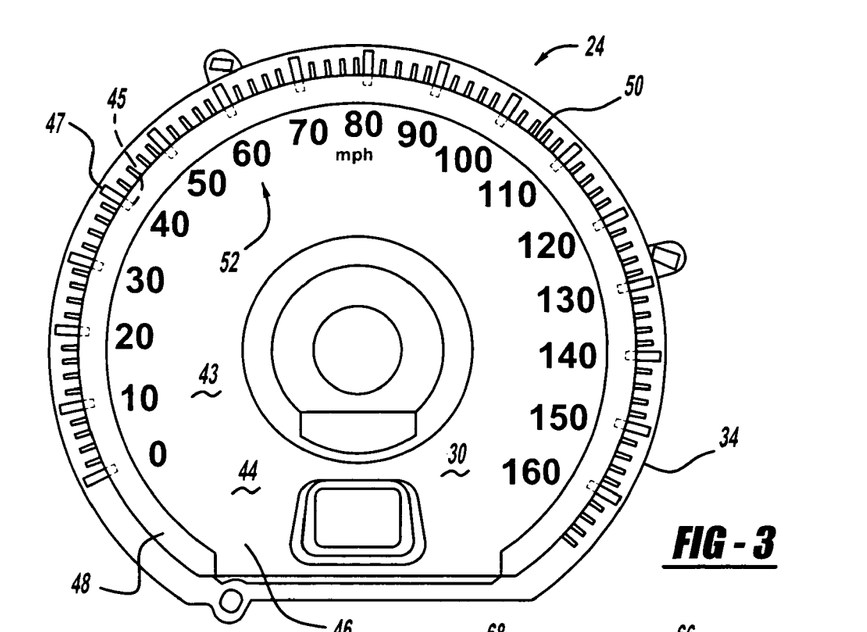
FIG. 3 is a front view of a gauge assembly in accordance with the teachings of the present disclosure.
Figure 4:
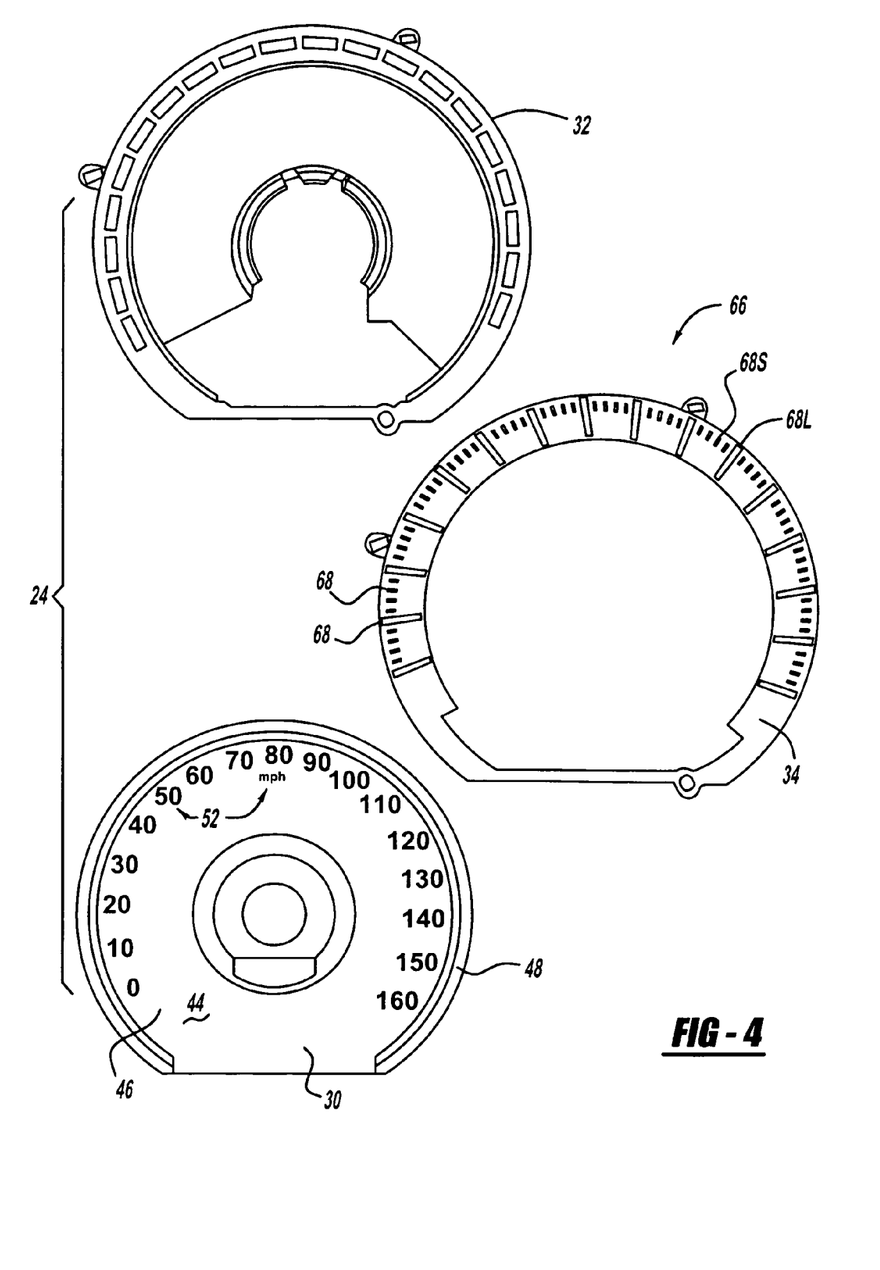
FIG. 4 is a front view of the components of the gauge assembly of FIG. 3.

With reference to FIGS. 3 and 4, the dial face 30 may be one piece, and generally be circular. The dial face 30 may define a front face 44 and may be flat or concave and may include a generally opaque portion 46 and a generally translucent ring or ring-like portion 48, which may be disposed around a perimeter or periphery 50 of the opaque portion 46. The translucent portion 48 may be tinted or "smoked" to restrict the passage of light or obstruct a viewer from viewing what is behind the translucent portion 48. In this regard, the entire dial face 30 may be formed from a generally transparent or translucent material to create the translucent portion 48. Portions of the dial face 30 may subsequently be silk-screened, painted, covered by a decal, or otherwise formed on (front or top side) or under (back or bottom side) the front face 44 to create the opaque portion 46. Alternatively, the opaque portion 46 and the translucent portion 48 may be formed as separate components and secured to each other to create a similar effect. Still yet, the opaque portion 46 and the translucent portion 48 may be formed from a single material, such as plastic. Opaque materials or portions may not permit light to pass through, while translucent materials or portions may permit light to pass through but diffuse the light so that objects on the opposite side are not clearly visible.

The translucent portion 48 may be tinted or smoked to make the translucent portion 48 of the dial face 30 appear to the driver to be generally opaque when little or no light is emitted from the light-carrying prism 32, but translucent when light is emitted form the light-carrying prism 32. In other words, the driver may generally not see objects through the translucent portion 48 until the object is illuminated in some manner. Additionally, low light conditions may make the translucent portion 48 appear opaque. Tinting the translucent portion 48 may be accomplished in any suitable manner, such as by securing a tinted decal to the front face 44, applying a tinted glaze to the front face 44, or by selecting a tinted or smoked construction material, such as plastic.

Graphics 52 may be formed on the front face 44 and may include any combination of letters, numbers, shapes, and other figures or icons that may be necessary to convey information to a driver. The graphics 52 may be opaque or translucent, or a combination of such depending on the desired lighting effect and construction of the opaque portion 46 of the dial face 30. For example, if the dial face 30 is made from a translucent material, the graphics 52 or a portion of the graphics 52 may be formed by appropriately masking the dial face 30 when the opaque portion 46 is formed on the front face 44. This will permit light to pass through the dial face at the portions that were masked. In another example, the graphics 52 may be applied as a decal, be silk-screened, be painted, or otherwise be formed on the front face 44. In the particular example depicted in FIG. 3, the graphics 52 are generally translucent numbers disposed around and proximate to the periphery 50 of the dial face 30 to represent a speed range the vehicle 10.

With reference now to FIGS. 4 and 6, the light-carrying prism 32 may be a rotationally-swept or circular body having a light-receiving inner portion 40 and the light-emitting outer portion 42 disposed on opposite sides of a light-carrying body portion 54. The inner portion 40 may be disposed near a circular center of the prism 32, and the outer portion 42 may generally form an outer periphery 56 of the prism 32. The prism 32 may receive light through the inner portion 40 and carry, pass or transmit the received light to the outer portion 42. The light may be used to advantageously illuminate the gauge 24. More specifically, the light that enters the prism 32 at the light receiving inner portion 40 may exit the prism 32 anywhere along, or at either end 40, 42 of the prism 32 to illuminate the gauge 24. The body portion 54, the inner portion 40, and the outer portion 42 may be formed as separate components and secured in a suitable manner, such as by gluing or heating and melting, to form a single piece light prism, such as light prism 32.

The light receiving inner portion 40 may be disposed proximate to the light source 22, such that the inner portion 40 is close enough to receive light from the light source 22. Additionally, the light receiving inner portion 40 may include a light-receiving face 58, which may receive light from the light source 22 and transmit the light into the body portion 54. Subsequently the light may pass through a cross-section of the prism 32 to a light-reflecting face 60. The light-receiving face 58 may be bulbous, convex, rounded and/or generally arcuately shaped in cross-section to refract, direct and focus light received from the light source 22 toward the face 60. Although the light-receiving face depicted in FIG. 6 is rounded to some degree, the light-receiving face 58 may take other shapes, such as a flat surface 58', as depicted in phantom. It will be further appreciated that other shapes of face 58 may operate to receive light from the light source 22 but, depending on the shape of the face 58 of the light-receiving portion 40, might refract and focus the received light differently toward the face 60, and accordingly the light ultimately emitted from the outer portion 42 may be less intense. The face 60 may extend radially outwardly toward an outside perimeter of the of the prism 32, and also upwardly relative to the light source 22. Furthermore, the face 60 may reflect the light received through the light-receiving face 58 into the body portion 54 of the prism 32 and toward the outer portion 42 of the prism. The face 60 may also emit a portion of the light that reaches the face 60. Light rays are generally depicted in the figures using arrows.

The outer portion 42 may include another light-reflecting face 62, which may extend outwardly and upwardly relative to the light source 22, and also a light-emitting face 64. After being carried through the body portion 54, light may reach the face 62, which may reflect the light toward the face 64. The face 64 may be disposed behind and radially offset from the dial face 30 to define a gap 38. That is, when viewed from a driver's perspective in seat 16, a portion of the face 64 may extend beyond a radial periphery of the tinted, translucent portion 48 while a remaining portion of the face 64 may extend behind the opaque portion 46. The face 64 may emit light reflected from the face 62 out of the prism 32. The face 64 may be arcuately shaped in cross-section to refract and disperse the escaping light in a diverging disbursement pattern. However, the face 64 may also be flat.

In summary, with particular reference to FIG. 6, light from the light source 22 can be received into the prism 32 through the light-receiving face 58. The face 58 may direct the light toward the first light-reflecting face 60, which in turn may redirect the light through the body portion 54 and toward the second light-reflecting face 62. Light may also pass through the face 60 to help illuminate the dial face 30. The face 62 may redirect the light toward the light-emitting face 64 and out of the light prism 32. In this manner, the intensity of the light emitted from the face 62 may be controlled by controlling the amount of light focused on the reflecting face 60 by the receiving face 58. Other outer surfaces that make up light prism 32 may also emit some of the light that has been received within the light prism 32 and reflect the rest of the light toward the light-emitting face 64. In this regard, outer surfaces of the light prism 32, other than the light-receiving face 58 and light-emitting face 64, may be textured, which may help the outer surfaces to both emit and reflect the light. The intensity of the light emitted through the outer surfaces may be less than the intensity of the light emitted through the face 64.

Figure 5:
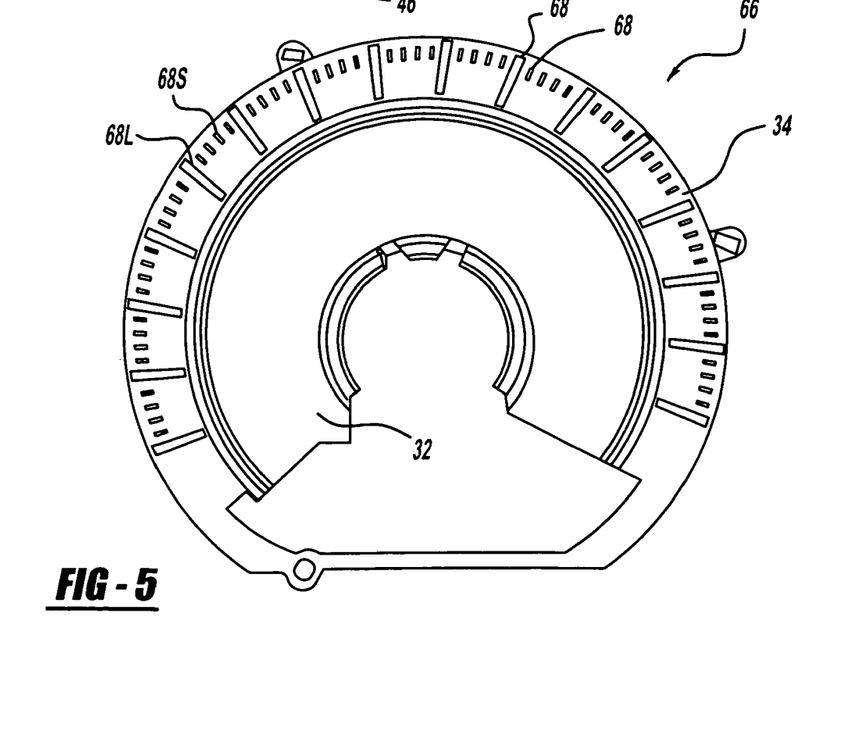
FIG. 5 is a front view of a cover secured to a light prism of the gauge assembly of FIG. 3.

With referring now including FIGS. 4 and 5, the prism cover 34 may be a thin, generally annular cover that compliments the peripheral shape of the outer portion 42 of the light prism 32 and the general shape, or contour, of the light-emitting face 64. Apertures 66 extending through the cover 34 may form graduated lines 68, or grads, spaced around the periphery of the cover 34. As depicted in FIG. 4, grads 68 are arranged in a manner consistent with a speedometer gauge including shorter grads 68S and longer grads 68L, which occur at about every fifth grad 68. Alternatively, the grads 68 may be formed directly on the light-emitting face 64 in a suitable manner, thereby obviating the need for the cover 34. For example, portions of the face 64 corresponding to the grads 68 may be masked and the remaining portion of the face 64 may be silk-screened or painted, forming the grads 68 when the masking is removed. In another example, a decal having apertures forming the grads 68 may be applied to the face 64.

The grads 68 may be positioned in the cover 34 (or on the face 64) such that a portion of at least some of the grads 68 extend behind the tinted, translucent portion 48 when the light prism 32 is disposed behind the dial face 30, while the remaining portions of the grads 68 extend outward from the translucent portion 48. In this manner, the tinted translucent portion 48 generally obscures the portions of the grads 68 that extend behind the dial face 30 when the light source 22 is not emitting light. In the particular example of FIG. 3, the grads 68L partially extend behind the tinted translucent portion 48 and the grads 68S do not extend behind the tinted translucent portion 48.

A driver of the vehicle 10 sitting in the seat 16 and viewing the gauge 24 may experience different visual effects, depending on the condition of the light source 22. When the light source 22 is not emitting light, the portion of the grads 68L extending outward from the translucent portion 48 of the dial face 30 may be visible to the driver. However, the tinted, translucent portion 48 may hide the portion of the grads 68L that extend behind the dial face 30. In other words, only part of the grads 68L may be visible to the driver when the light source 22 is not emitting light.

Light carried through the light prism 32 when the light source 22 emits light may illuminate the space or void 36 between the dial face 30 and the light prism 32. If some of the graphics 52 are translucent, as previously described, the light in the void 36 may illuminate the translucent graphics 52. In addition, some of the light may escape from the void 36 through the space or gap 38 and create a halo of light around the periphery of the dial face 30 since light will shine to the periphery of the dial face 30. The halo may further spill over the front face 44 of the dial face to further illuminate any of the opaque graphics 52 formed on the front face 44. The brightness of the halo may depend upon the intensity of the light escaping from the light prism 32 and illuminating the void 36.

Further, light emitted through the body portion 54 of the light prism 32 and to the outer portion 42 may illuminate the grads 68. Illuminating the grads 68L may make any previously obscured portions of the grads 68L (when the light source 22 is not emitting light) visible through the tinted, translucent portion 48, thereby making the grads 68L appear to grow in length when viewed by a driver in the seat 16. In addition, the offset relationship between the light-emitting face 64 and the translucent portion 48, combined with the depth (cross-sectional thickness) of the outer portion 42 of the light prism 32, may cause the grads 68 to appear to grow in depth, thereby creating a three-dimensional visual effect. In addition to being aesthetically pleasing when illuminated (and even when not illuminated), the three-dimensional effect imparted on the grads 68 and the lighting effect on the translucent graphics 52 may permit a driver to be quickly informed of the current vehicle speed. Any prior problems related to the length of time in first locating the correct gauge on the dash, and then reading a prior two-dimensional gauge, for example, will have been overcome. Additionally, the three-dimensional effect may desirably quickly distinguish the gauge 24, which may be a speedometer, from other less important or less frequently viewed gauges. The distinguished gauge 24 may also reduce the amount of time necessary for the driver to determine a speed of the vehicle 10, thereby permitting the driver to spend more time concentrating on operating the vehicle 10 relative to the road surface.

Figure 7:
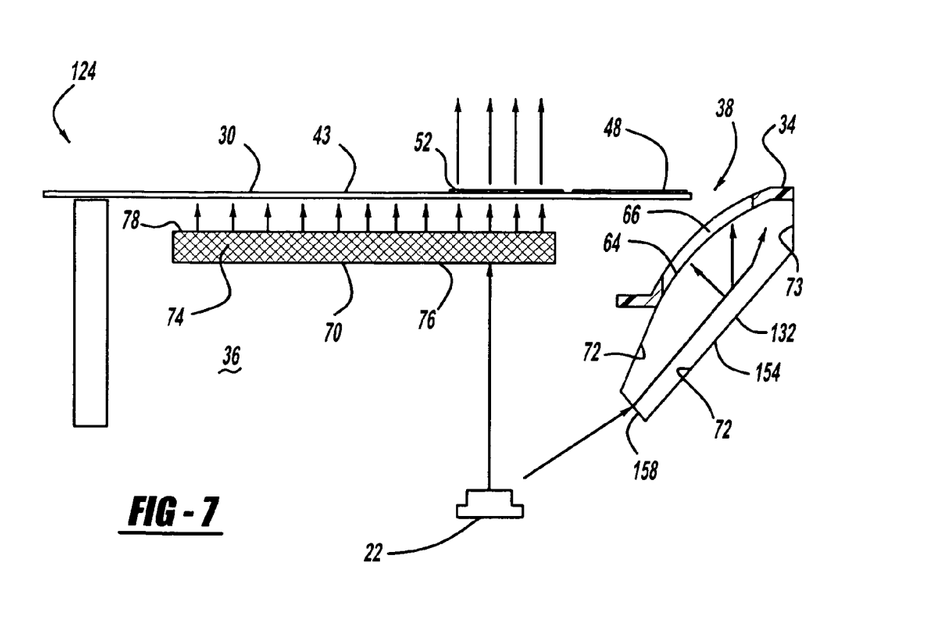
FIG. 7 is a cross-sectional view of another embodiment of a gauge assembly in accordance with the teachings of present disclosure.

With reference now including FIG. 7, another embodiment of a gauge 124 is depicted. A gauge 124 may include a light prism 132, a prism cover 34, a dial face 30, and a light diffuser 70. The dial face 30 may be disposed in front of the light prism 132 to define the space or void 36 and the gap 38, and the light diffuser 70 may be disposed in the void 36. The prism cover 34 may be secured to the prism 132 using glue, a snap-type fit, traditional fastener(s), or other means.

The light prism 132 may include a light-receiving face 158 and a light-emitting face 64 generally disposed at opposite ends of a light-carrying body portion 154. The light-receiving face 158 may be a generally flat face positioned generally facing a light source 22 so that the face 158 can receive light emitted from the light source into the body portion 154. First inner surface 72 and second inner surface 73 of the body portion 154 may reflect the light within the body portion 154 until the light is emitted from the body portion 154 through the face 64.

The light diffuser 70 may be disposed between the light source 22 and translucent graphics 54. The diffuser 70 may be a generally annular body 74, which may include a back face 76 and a front face 78 disposed on opposite sides of the body 74. The back face 76 may receive light emitted from the light source 22 into the body 74. The body 74 may diffuse, disperse or scatter the light received from the light source 22 throughout the body 74 and emit the light through the front face 78 and toward translucent graphics 52 of the dial face 30. The diffused light emitted by the body 74 and more specifically, emitted through the face 78, may be more uniform than light emitted directly from the light source 22. Such more uniform light may more uniformly illuminate the graphics 54. The area 48 represents a translucent, tinted or "smoked" portion 48. The translucent area 48 typically can not be seen through unless it is backlit, in such case a driver may then be able to see through the translucent portion 48. The light prism 132, prism cover 34, and dial face 30 may operate substantially as previously described to create the three-dimensional effect of grads 68 and the halo of light around the perimeter of the dial face 30.

Figure 8:
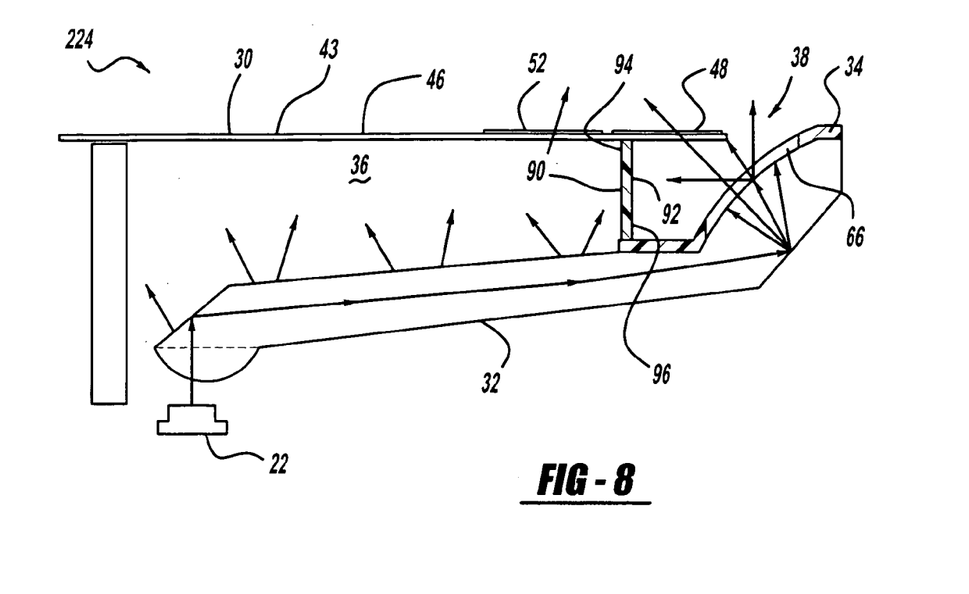
FIG. 8 is a cross-sectional view of another embodiment of a gauge assembly in accordance with the teachings of present disclosure.

With reference now including FIGS. 8-11, additional embodiments of a gauge are depicted. Such embodiments may include a wall that may control light intensity of a halo of light that may be present around the dial face 30 when the light source 22 is emitting light. To create the halo of light, light passes from the light source 22 through the light prism 32 and then out of the prism 32 and the apertures 66 and around the perimeter of the dial face 30 to create a halo effect of light that may be viewed by a vehicle driver in the seat 16. With particular reference now to FIG. 8, a third embodiment of a gauge 224 is depicted. The gauge 224 and operation of the gauge 224 may be substantially the same as the gauge 24; however, the gauge 224 may further include a wall or wall portion 90 secured between the dial face 30 and the prism cover 34. That is, the wall portion 90 may actually contact and be attached to each of the dial face 30 and the prism cover 34 using traditional fasteners, glue or a snap fitting. Wall portion 90 may include a thin-walled, generally annular body 92, which may further include a wall first end 94 and a wall second end 96. A peripheral size and shape of the annular body 92 may preferably compliment (be the same) a shape and size of the periphery 50 (FIG. 3) of the opaque portion 46 of the dial face 30. The wall portion 90 may be disposed in the void 36 such that the periphery of the body 92 generally aligns with periphery 50 and that the wall portion 90 is behind the dial face 30. In this regard, it is not necessary that the body 92 be fully aligned with the periphery 50. However, it is desirable that the particular configuration and alignment of the body 92 with respect to the periphery 50 does not interfere with the driver's view of the grads 68 through the tinted/smoked, or translucent portion 48.

The wall end 94 and wall end 96 may make contact the dial face 30 and the prism cover 34, respectively, to shield or wall off the void 36 and control an intensity of the light emitted from the void 36 and through the gap 38. In this regard, the body 92 may be formed from a material having translucent properties that may create or at least impact the desired intensity of the halo of light around the perimeter of the dial face 30. For example, a less translucent (i.e., less transparent) material may be selected to dim or more greatly diffuse light and hence reduce the halo of light, while a more translucent (i.e., more transparent) material may be selected to increase, brighten, or diffuse less light, and brighten the halo of light. In yet another example, the body 92 may be opaque to generally inhibit or prevent light from escaping the void 36 through the gap 38 thereby greatly reducing the halo effect from light passing through the void 36.

Figure 9:
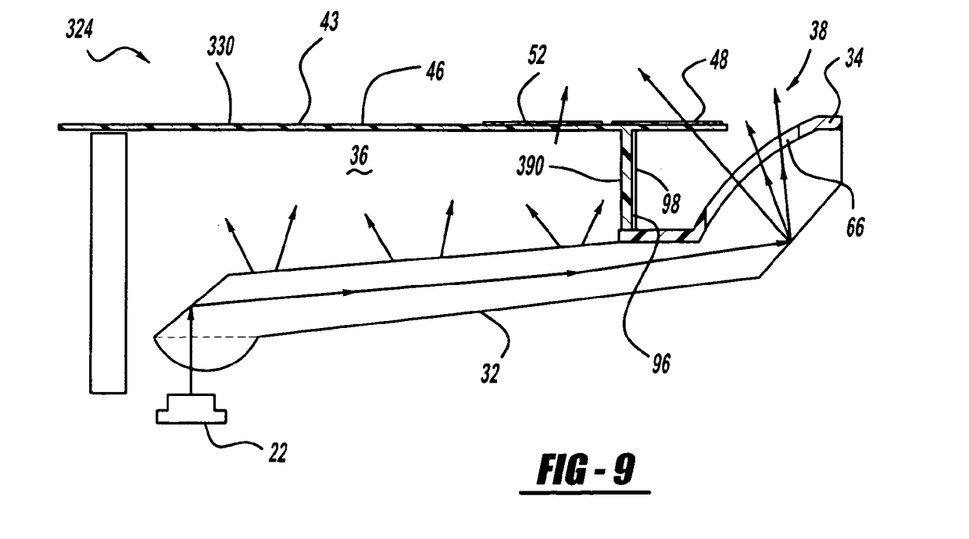
FIG. 9 is a cross-sectional view of another embodiment of a gauge assembly in accordance with the teachings of present disclosure.

With reference to FIG. 9, a gauge 324 is depicted having a dial face 330 and a wall portion 390 formed integrally with the dial face 330 and extending toward or to the prism cover 34. The wall end 96 may physically contact the prism cover 34 to shield or wall off the void 36 and prevent any light from the void 36 from reaching the gap 38 to otherwise contribute to a halo of light around the dial face 330 already produced by light passing through the light prism 32. The gauge 324 may further include an optional decal 98, which may be applied to an outer (or inner) surface of the wall portion 390. The optional decal 98 may be particularly desirable if the material used to form the dial face 330 is less translucent than necessary to create the desired intensity of the halo. Alternatively, the outer surface of the wall portion may be painted or otherwise covered to generally inhibit light from escaping the void 36 through the gap 38 and generally eliminating any contribution to the halo of light.

Figure 10:
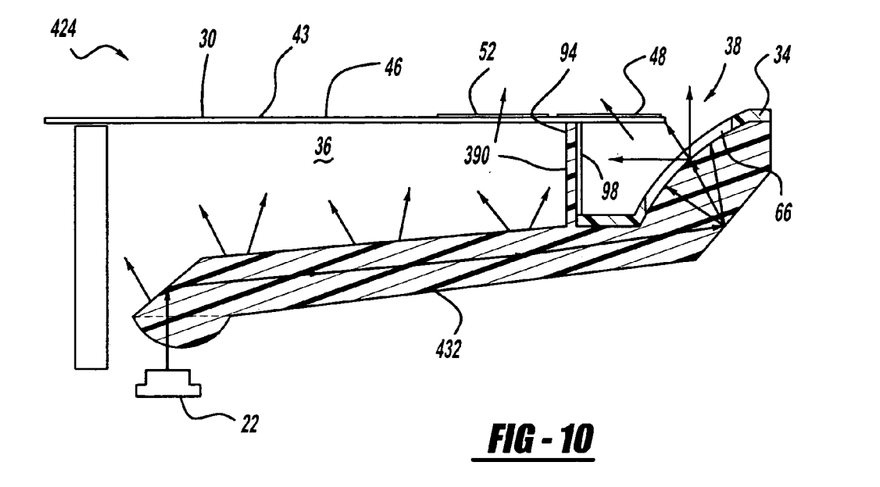
FIG. 10 is a cross-sectional view of another embodiment of a gauge assembly in accordance with the teachings of present disclosure.

With reference to FIG. 10, a gauge 424 is depicted having a light prism 432 and a wall portion 390 formed integrally with the light prism 432 and extending toward the dial face 30. The dial face 30 may rest upon or be attached or connected to the wall portion 390 using glue, traditional fasteners or a snap fit. The end 94 of the wall portion 390 may communicate with the dial face 30 to wall off the void 36. The wall portion 390 of the gauge 424 may include the optional decal 98, or the wall portion 390 may be painted or otherwise covered, even if it is a covering to block 100% of the light, to create the desired intensity of the halo.

Figure 11:
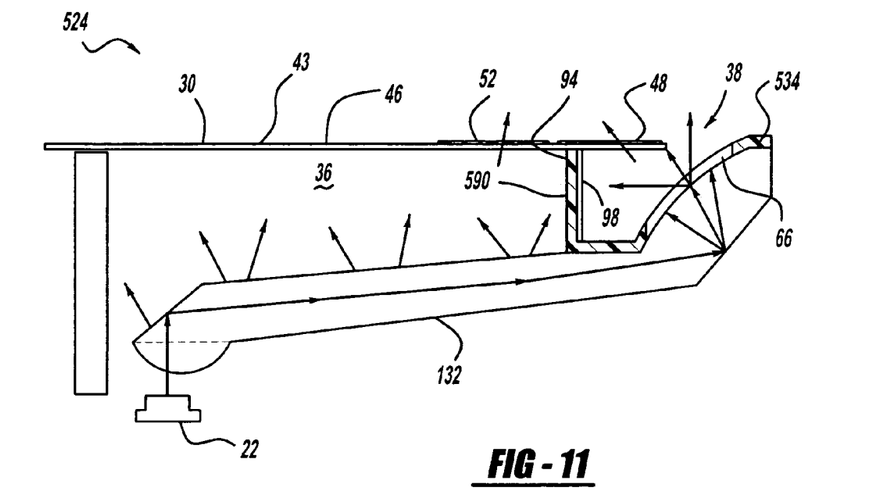
FIG. 11 is a cross-sectional view of another embodiment of a gauge assembly in accordance with the teachings of present disclosure.

With reference to FIG. 11, a gauge 524 is depicted having a prism cover 534 and a wall portion 590 formed integrally with the cover 534 and extending toward the dial face 30. The end 94 may contact the dial face 30 to shield or wall off the void 36. The wall portion 590 of the gauge 524 may include the optional decal 98 or the wall portion 590 may be painted or otherwise covered to create the desired intensity of the halo of light that escapes through the gap 38.

So then, what is disclosed includes a gauge illuminated by a light source 22. The gauge 24 may include a dial 43 having a dial face 44, a translucent portion 48 of the dial 43 forming at least a perimeter of the dial face 44, and a prism cover 34 disposed behind the dial face 44 and defining a plurality of apertures 66 which define a plurality of graduations, at least one of the plurality of graduations having a first portion 45 extending behind (shown in phantom in FIG. 3) the translucent portion 48 and a second portion 47 extending radially outward of the translucent portion, the first portion 45 being visible through the translucent portion 48 when the gauge 24 is illuminated by the light source 22 and the first portion 45 being non-visible behind the translucent portion 48 when the gauge 24 is not illuminated by the light source 22. The translucent portion 48 may be tinted, also known as "smoked." A light-emitting prism 32 may be disposed behind the dial 43 or dial face 44. The light-emitting prism 32 may be disposed behind the cover 34, also known as a prism cover 34. The cover 34 may be integrally formed on the light-emitting prism 32. The graduations 68S, 68L may be different lengths with the longer graduation 68L that is visible in phantom area 45 with the light source 22 "on" but not visible in the phantom area 45 with the light source 22 "off" as depicted in FIG. 3. That is, more of a length of the at least one of the plurality of graduations 66 is visible from a front of the dial 43 when the gauge 24 is illuminated by the light source 22 than when not illuminated by the light source 22. The at least one of the plurality of graduations 68L appears to increase in length, as viewed from a front of the dial face, when the gauge is illuminated by the light source.

In another aspect, a gauge 24 may be illuminated by a light 22. The gauge 24 may employ a dial face 44 on a dial 43, the dial 43 defining an outer perimeter adjacent a gap 38, a light prism 32 mounted to a mounting board 20 and disposed between the dial face 44 and the mounting board 20. The light prism 32 may be radially offset or extend beyond the radial perimeter of the dial face 44. A gap 38 may be defined between the light prism 32 and the dial face 44 at an outer perimeter of the dial face 44, the light prism 32 operable to receive light from a light 22 and direct the light through the gap 38. A cover 34 may be disposed against a portion of the light prism 32 to direct light beyond the outer perimeter of the dial 43. A wall 90 may be situated perpendicular to the dial 43 and extending between the dial 43 and the light prism 32 and defining a void 36, the wall 90 to control an intensity of light passing from the void 36 and through the gap 38 when the light prism 32 emits light received from the light 22.

The dial 43 may include lighted graphics 52, which may be illuminated because they are translucent. The graphics 52 may be illuminated by the light from the light prism 32 after the light has passed through the space or void 36. The wall 390 may be integrally molded and be one piece with the dial face 30. Alternatively, the wall 390 may be integrally molded with the light prism 32. Still yet, the wall 590 may be integrally formed as one piece with the cover. Finally, the wall 90 may be translucent, or the wall 90 may be opaque to block the passage of light.

In yet another alternative, a gauge 24 may employ a light source 22. A dial 43 may have an opaque body portion 46 and have a translucent perimeter 48 extending around the opaque body portion 46. The translucent perimeter may extend to the edge of the dial 43. A light prism 32 may receive light from the light source 22 and may be disposed behind the dial face 30. The light prism 32 may employ a light-carrying body portion 49 and a light-emitting face 64 that receive light from the light source, the light-emitting face 64 located behind and radially beyond the translucent perimeter of the dial 43 and dial face 30, the light-emitting face 64 emitting light through the translucent perimeter 48 and radially beyond the translucent perimeter 48. A prism cover 34 may be disposed between the light-emitting face 64 and the translucent perimeter 48 of the dial face 30. The prism cover 34 may define a plurality of graduations 68 such that a portion of the graduations 68 are not visible through the translucent perimeter 48 when the light-emitting face 64 does not emit light from the light source 22. To the contrary, a portion of the graduations 68 are visible through the translucent perimeter 48 when the light-emitting face 64 emits light from the light source 22.

The translucent perimeter 48 of the dial 43 and the prism cover 34 may define a gap 38 therebetween. The gap 38 may permit light to pass and wrap around the perimeter of the dial 43 to create a halo effect with light furnished by the light source 22. A wall 90, 390 extending between the dial 43 or dial face 30 and the light prism 32 may define a generally enclosed void 36. The wall 90, 390 may be translucent and operable to control an intensity of light escaping from the void 36 and into the gap 38.

In yet another arrangement, a gauge 24 may employ a light source 22 and a dial 43 having a dial face 30 with translucent indicia 52. The dial face 30 may have a generally opaque body portion 46 and a translucent perimeter 48 extending radially around the radial perimeter portion of the opaque body 48. A light diffuser 70 may be disposed between the light source 22 and the dial 30 to evenly distribute light to the indicia 52 and the translucent perimeter 48. A light prism 32 may be disposed radially beyond the light diffuser 70. Stated differently, the light prism 32 may be disposed at a farther radius than the light diffuser 70, as measured from the center of the dial 43. A prism cover 34 may be disposed upon the light prism 32. The prism cover 34 may be glued to or snapped onto the light prism 32, may be located between the dial 43 and the light prism 32, and may define a plurality of slots or apertures 66 to permit light to pass through the prism cover 34. Furthermore, the light prism 32 may receive light from the light source 22, direct the light through the light prism 32, then through the slots 66, and then through the translucent perimeter 48. The light prism may further direct light radially beyond the translucent perimeter 48 and further generate a halo effect around the perimeter of the dial 43.

What is claimed is:

1. A gauge illuminated by a light source, the gauge comprising:
    a dial face;
    a translucent portion of the dial face forming at least a perimeter of the dial face;
    a light emitting prism disposed behind the dial face; and
    a cover disposed behind the dial face and defining a plurality of apertures defining a plurality of graduations, at least one of the plurality of graduations having a first portion extending behind the translucent portion and a second portion extending radially outward of the translucent portion, the first portion being visible through the translucent portion when the gauge is illuminated by the light source and the first portion being non-visible behind the translucent portion when the gauge is not illuminated by the light source.

2. The gauge of claim 1, wherein the translucent portion is tinted.

3. The gauge of claim 1, wherein the light-emitting prism is disposed behind the cover.

4. The gauge of claim 1, wherein the cover is integrally formed on the light-emitting prism.

5. The gauge of claim 1, wherein the graduations are different lengths.

6. The gauge of claim 5, wherein more of a length of the at least one of the plurality of graduations is visible from a front of the dial when the gauge is illuminated by the light source than when not illuminated by the light source.

7. The gauge of claim 6, wherein the at least one of the plurality of graduations appears to increase in length, as viewed from a front of the dial face, when the gauge is illuminated by the light source.

8. A gauge comprising:

a light source;

a dial face having an opaque body and a translucent perimeter extending around the opaque body;

a light prism that receives light from the light source, the light prism disposed behind the dial face, the light prism having a light-carrying body and a light-emitting face that receive light from the light source, the light-emitting face located behind and radially beyond the translucent perimeter of the dial face, the light-emitting face emitting light through the translucent perimeter and radially beyond the translucent perimeter; and a prism cover disposed between the light-emitting face and the translucent perimeter of the dial face, the prism cover defining a plurality of graduation lines wherein a portion of the graduation lines are not visible through the translucent perimeter when the light-emitting face does not emit light from the light source, and a portion of the graduation lines are visible through the translucent perimeter when the light-emitting face emits light from the light source.

9. The gauge of claim 8, wherein the translucent perimeter and the prism cover define a gap therebetween.

\* \* \* \* \*